US007284598B2

(12) United States Patent
Mulder

(10) Patent No.: US 7,284,598 B2
(45) Date of Patent: Oct. 23, 2007

(54) SUPPORT FOR A TUBE BUNDLE

(75) Inventor: Dominicus Fredericus Mulder, Amsterdam (NL)

(73) Assignee: Shell Oil Company, Houston, TX (US)

( * ) Notice: Subject to any disclaimer, the term of this patent is extended or adjusted under 35 U.S.C. 154(b) by 405 days.

(21) Appl. No.: 10/913,156

(22) Filed: Aug. 6, 2004

(65) Prior Publication Data

US 2005/0063226 A1    Mar. 24, 2005

(30) Foreign Application Priority Data

Aug. 6, 2003 (EP) .................................. 03077463

(51) Int. Cl.
*F28D 7/06* (2006.01)
*F28F 9/013* (2006.01)

(52) U.S. Cl. ........................ 165/162; 165/161; 165/172

(58) Field of Classification Search ................ 165/162, 165/172, 161
See application file for complete search history.

(56) References Cited

U.S. PATENT DOCUMENTS

| 2,018,037 | A | 10/1935 | Sieder ......................... 257/239 |
| 3,399,719 | A | 9/1968 | Forrest et al. ................. 165/47 |
| 3,964,146 | A * | 6/1976 | Vestre et al. ................. 165/162 |
| 3,967,677 | A * | 7/1976 | Mohlman ..................... 165/162 |
| 4,143,709 | A | 3/1979 | Cunningham ................ 165/172 |
| 5,366,188 | A | 11/1994 | Kramer et al. .............. 248/68.1 |
| 6,059,022 | A * | 5/2000 | Wilson ......................... 165/162 |
| 2003/0173066 | A1 * | 9/2003 | Mulder ........................ 165/157 |

* cited by examiner

Primary Examiner—Leonard R Leo
(74) Attorney, Agent, or Firm—Charles W. Stewart

(57) ABSTRACT

A support for a bundle of parallel tubes, comprising at least two spaced apart transverse support plates, wherein each plate is provided with a plurality of openings of substantially rhombical or substantially frustro-rhombical shape, each of which openings having a maximum of two mirror symmetry axes including a characteristic mirror symmetry axis, the openings being large enough to accommodate at least two tubes, wherein openings in different support plates are arranged to form support passages for parallel tubes so that support passages extending through the same opening in one support plate extend through different openings in another support plate, and wherein the characteristic mirror symmetry axes of at least two openings belonging to the same support passage are arranged to extend in different directions.

17 Claims, 8 Drawing Sheets

SUPPORT FOR A TUBE BUNDLE

FIELD OF THE INVENTION

The present invention relates to a support for a bundle of parallel tubes, in particular to such a support comprising at least two transverse support plates spaced apart along the direction of the tubes to be supported.

A support plate is sometimes also referred to as a support sheet or a support baffle.

A bundle of parallel tubes is also referred to as a tube bundle.

BACKGROUND OF THE INVENTION

A major area of application of tube bundles is in shell-and-tube heat exchangers. A shell-and-tube heat exchanger comprises a cylindrical vessel in which a bundle of parallel tubes are arranged extending in longitudinal direction of the vessel.

As is well known, the shell-and-tube heat exchanger is an indirect heat exchanger in which heat is transferred between a fluid passing through the tubes of the tube bundle (the tube side) and a fluid passing through the space outside the tubes (the shell side). Details of the shell-and-tube heat exchangers can for example be found in Perry's Chemical Engineers' Handbook, 6$^{th}$ edition, 1984, McGraw-Hill Inc., page 11-3 to 11-21. The ends of the tubes of the tube bundle are secured to a tube sheet. The heat exchanger can include two tube sheets, one at each end of the cylindrical vessel, or a single tube sheet at one end of the cylindrical vessel in the event the heat exchanger is a U-tube exchanger.

The tubes need to be supported. This can be done by axially spaced apart transverse supports.

It will be understood that the intermediate portions of the tubes have to be supported as well, for example to prevent damage to the tubes due to vibrations caused by the fluid flow. To support the intermediate portions of the tubes, a support can be used including transverse support plates that are spaced apart along the length of the tubes.

A conventional support comprises segmental baffles, and there are several kinds discussed in Perry's. Baffles do not only support the tubes, but also influence the fluid flow through the shell side. Therefore the design of a baffle is as well determined by heat-transfer considerations.

Another type of tube support is formed of rods or bars arranged in lanes between the rows of tubes. A transverse support consists of a support ring that has an outer diameter that is somewhat smaller than the inner diameter of the cylindrical vessel and parallel rods or bars that are secured at their ends to the support ring.

Tubes of a tube bundle are most commonly arranged on an equilateral triangular pitch (wherein the tubes are so arranged that their centres are on the corner points of equilateral triangles). A square pitch (wherein the tubes are so arranged that their centres are on the corner points of squares) is also used, often for mechanical cleaning purposes in removable-bundle exchangers.

U.S. Pat. No. 4,143,709 discloses a support for a bundle of parallel tubes, which support comprises a plurality of transverse support plates spaced apart along the length direction of the tubes to be supported. Each plate is integrally formed from a single sheet wherein a plurality of holes is cut on a regular grid, each of which holes is large enough to accept a plurality of tubes. The holes can be generally rectangular-shaped, generally square-shaped, generally triangular-shaped or generally rhombical (diamond-shaped).

At least one of the support plates of the known support is disposed out of phase or staggered. Tubes extending through the same hole in one support plate extend through different holes in another support plate, so that the cooperating adjacent plates support the tubes from opposite sides against lateral movement.

The generally triangular-shaped or generally diamond-shaped embodiments are adapted to support tubes on a triangular pitch. However, in these embodiments the width of the cross-laths of the supporting grid must be made significantly less than the shortest distance between adjacent tubes, which is not optimal for reasons of mechanical strength.

Applicant has found that tube supports can very advantageously be manufactured using expanded metal, and this is the subject of International Patent Application No. PCT/EP03/01074 in the name of Applicant, which was unpublished at the first filing (priority) date of the present application.

A sheet of expanded metal is made from sheet metal that is slit according to an arrangement of staggered parallel dashed lines, and stretched (expanded) perpendicular to the dashed lines into a structure of cross laths with interstices. Its manufacture is simple and cheap. Moreover the sheets can easily be cut to a desired shape for a particular application, e.g. circular shape, for example by laser cutting.

The openings of expanded metal have substantially rhombical or frustro-rhombical shape. Substantially rhombical shape (the shape of an equilateral parallelogram) is obtained when the slits along a virtual dashed line are much longer than the non-slit parts (so-called bonds) between them. After stretching of the slit sheet metal, the bonds form corner points each connecting four so-called strands of equal length. If the non-slit parts between the slits are relatively long, than a substantially frustro-rhombical shape is obtained. By frustro-rhombical it is meant that two opposite corners of a rhombical shape are cut off along a pair of parallel lines. Known expanded metal is stretched to a maximum of 90 degrees, resulting in approximately square openings, as can for example be obtained from Sorst Streckmetall GmbH, Hannover, Germany.

The strands after stretching of expanded metal are not perfectly straight but often slightly S-shaped; i.e. curved at the connections with the bonds, with a substantially linear central part in between. It will be understood that the V-shape of pairs of adjacent (neighboured) strands in the direction of stretching is somewhat distorted. The stretching angle is suitably defined by the central parts of the strands forming the (distorted) V-shape.

Also, when expanded metal is stretched out, the strands are twisted out of the plane of the sheet metal, unless the sheet is subsequently flattened again. The slight S-shape of the strands and their attachment to the bonds has the consequence that the openings have no more than two mirror symmetry axes, which can be along and perpendicular to the direction of the stretching. This will be discussed in more detail with reference to the drawings.

To account for deviations of the openings in expanded metal from a perfect rhombical or frustro-rhombical shape are, the term 'substantially rhombical or frustro-rhombical shape' is used in the description and in the claims. The term therefore encompasses perfect and imperfect or distorted such shapes.

Applicant has found that the deviations from perfect rhombical or frustro-rhombical shape make it difficult to use expanded metal in a staggered arrangement like in U.S. Pat. No. 4,143,709, since at least two different types of passageways are formed with slightly different cross-section and shape, which is undesirable for optimum tube support.

It is an object of the present invention to provide an improved support for a tube bundle, comprising at least two transverse support plates provided with a plurality of openings, wherein openings in different support plates are arranged to form support passages for parallel tubes so that support passages extending through the same opening in one support plate extend through different openings in another support plate. It is a particular object to provide such a support that provides optimised mechanical stability. It is another particular object of the invention to provide such an improved support that can be made of expanded metal.

SUMMARY OF THE INVENTION

The invention provides a support for a bundle of parallel tubes, which support comprises at least two transverse support plates spaced apart along the length direction of the tubes to be supported, wherein each plate is provided with a plurality of openings of substantially rhombical or substantially frustro-rhombical shape, each of which openings having a maximum of two mirror symmetry axes including a characteristic mirror symmetry axis, the openings being large enough to accommodate at least two tubes, wherein openings in different support plates are arranged to form support passages for parallel tubes so that support passages extending through the same opening in one support plate extend through different openings in another support plate, and wherein the characteristic mirror symmetry axes of at least two openings belonging to the same support passage are arranged to extend in different directions.

The invention is based on the insight gained by Applicant that openings having a unique characteristic mirror axis, such as along the stretching direction of expanded metal, can with advantage be arranged with their characteristic mirror symmetry axes rotated relative to each other in adjacent support plates, since in this way support passages for tubes can be formed that have relatively uniform cross-section and shape.

The term characteristic mirror symmetry axis is used in the description and in the claims to refer to a mirror symmetry axis that is unique, such that it can be unambiguously identified according to a predetermined characteristic, and is not similar to any other mirror symmetry axis of the opening. Examples of characteristic mirror symmetry axes are a mirror symmetry axis coinciding with a direction of elongation of an opening, and a mirror symmetry axis along the direction of stretching of a sheet of expanded metal.

The openings of the support plates are large enough to accommodate at least two tubes, preferably four tubes. This minimizes the restriction imposed on fluid flow in the shell side by a single support plate. The mechanical support for a tube in all directions is provided by co-operating support plates. To this end, openings in different support plates are arranged to form support passages for parallel tubes so that support passages extending through the same opening in one support plate extend through different openings in another support plate. Support in all directions is preferably provided by two co-operating support plates, but in principle it is also possible to have three or more support plates co-operating for support in all directions. If the openings are large enough to accommodate four tubes, suitably one opening in a selected support plate co-operates with four openings in a consecutive support plate so that four separate support channels are obtained.

Suitably the openings are elongated in the direction of their characteristic mirror symmetry axis. If elongated openings, that together form a support passage, are arranged with mutually perpendicular directions of their characteristic mirror axes, well-defined support channels are obtained.

Suitably the openings in a support plate form a regular grid, wherein the characteristic mirror symmetry axes of the openings in this support plate are parallel thereby defining a characteristic direction of the support plate, and wherein consecutive support plates are arranged so that their characteristic directions are rotated relative to each other about the length direction of the tubes to be supported.

Suitably a pair of such consecutive support plates is arranged at a relative rotation angle of 90 degrees. Further suitably, the regular grid has a first repetition length along the characteristic direction and a second repetition length perpendicular to the characteristic direction, and wherein the first and second repetition lengths are substantially equal. In this way a close packing of tubes can be supported with a minimum of obstructions in between the tubes. If the characteristic repetition lengths are not equal, a number of zig-zag shaped channels would be formed at an alternating 90 degree rotation angle between consecutive support plates. The term repetition length is used to refer to the distance that the regular grid needs to be translated (along a selected direction) in order that the openings of the translated grid overlay the openings of the non-translated grid.

Preferably the support plates are made from expanded metal because of easy manufacturing and low manufacturing cost.

Suitably the expanded metal is of the not flattened type. The twisted arrangement of strands minimizes the effective cross-section of the support, and minimizes obstructions to fluid flow in the shell side of the heat exchanger.

Applicant has found that overstretched expanded metal, i.e. metal having a stretching angle of larger than 90 degrees, allows to create uniform parallel support passages when several expanded metal sheets are placed one behind the other and mutually rotated so that the stretching directions extend in different non-parallel directions.

In one particular embodiment the bonds are longer than about one-fifth of the length of the strands, so that the openings have substantially frustro-rhombical shape, and the stretching angle is between 110 and 130 degrees, preferably as close as practically possible to 120 degrees.

In another particular embodiment the bonds are short and can be considered as corner points of a substantially quadratical shaped opening, so that the stretching angle is between 85 and 95 degrees, preferably as close as practically possible to 90 degrees.

Preferably the distance from the centrepoint of a selected bond to the centrepoint of the nearest bond on the same centreline is substantially equal to the distance from the centrepoint of the selected bond to the centrepoint of the second bond belonging to the same opening. Then, a regular grid is obtained having a repetition length in the direction of stretching that is equal to the repetition length perpendicular to the stretching direction. The term substantially equal is used in the sense that the deviation is 2% or less, preferably 0.5% (equivalent to 5 mm/m) or less, more preferably 0.2% (2 mm/m) or less. The stretching angle required in order to provide equal repetition lengths in the stretching and the perpendicular directions depends on the relative size of bonds and strands. Generally, the longer the bonds relative to the strands are, i.e. the longer the non-slit part relative to the slits along a virtual dashed line prior to expansion, the larger the stretching angle must be.

BRIEF DESCRIPTION OF THE DRAWINGS

The invention will now be described by way of example in more detail with reference to the accompanying drawings, wherein.

DETAILED DESCRIPTION OF THE INVENTION

Figure 1:
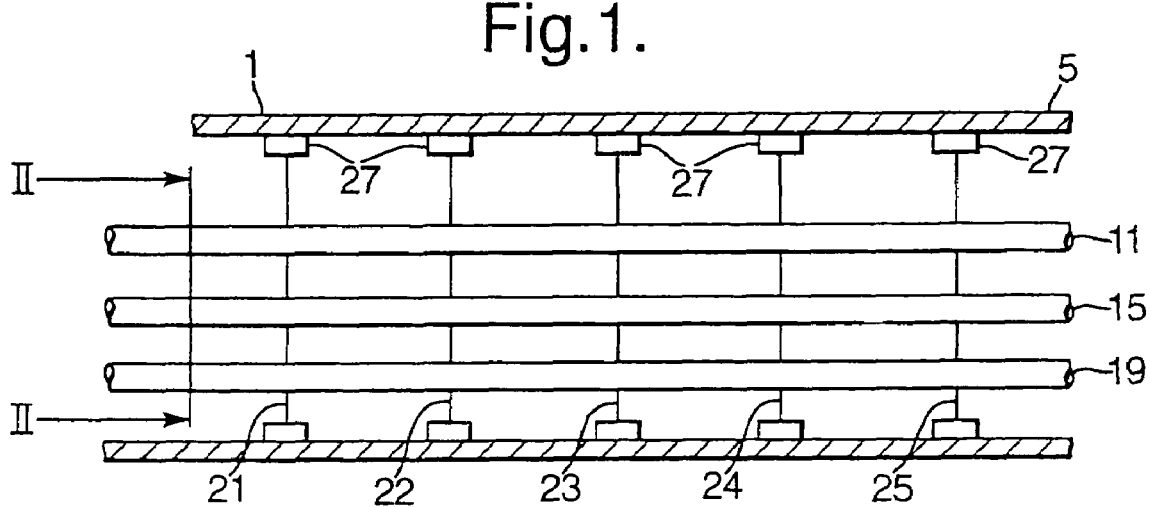
FIG. 1 shows schematically part of a longitudinal section through a heat exchanger including a tube bundle supported by the support of the present invention.

In the Figures, like reference numerals are used to refer to the same or similar parts.

Reference is made to FIG. 1 showing part of a longitudinal section through a heat exchanger 1 in the form of a cylindrical vessel having a cylindrical shell 5. A tube bundle formed of a plurality of parallel tubes, of which tubes 11, 15, and 19 are shown, is installed in the heat exchanger. The length direction of the tubes is parallel to the axis of the cylindrical shell 5. The support for the tube bundle according to the invention is formed by axially spaced apart transverse support plates 21, 22, 23, 24 and 25 supporting the intermediate parts of the tubes in the cylindrical shell 5 (not shown). Please note that FIG. 1 does not show the end parts of the tubes with the tube sheet.

Figure 2:
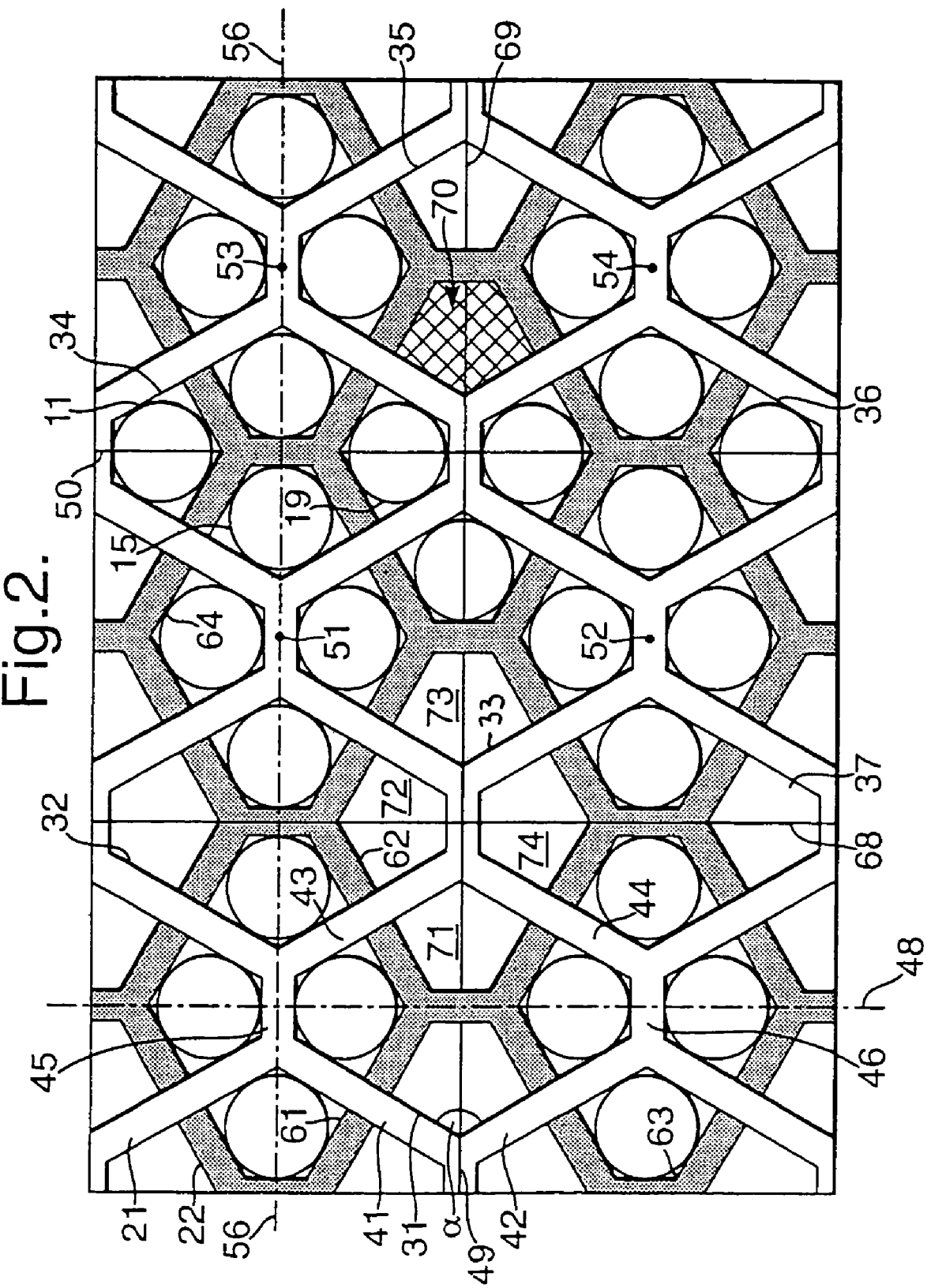
FIG. 2 shows schematically an embodiment of support plates according to the invention, in a view along line II-II of FIG. 1 and drawn at a larger scale.

Reference is made to FIG. 2 showing a view of the central part of support plates 21 and 22 along the longitudinal axis of the cylindrical shell 5 in FIG. 1. For the sake of clarity, FIG. 2 is drawn at a larger scale than FIG. 1, therefore the annular part of the support plates 21 and 22 is not visible. It shall be clear that the regular grid shown in FIG. 2 extends over at least the cross-section of the heat exchanger that is occupied by parallel tubes, and that the annular parts of the support plates are attached to the shell in a suitable way. The other support plates of FIG. 1 are not shown in FIG. 2 for the sake of clarity.

We will first discuss the characteristics of support plate 21. Plate 21 is provided with a plurality of openings, openings 31, 32, 33, 34, 35, 36, 37 are indicated with a reference numeral. Each of the openings has substantially frustro-rhombical shape, which will be explained at the hand of opening 31. Opening 31 is defined by two pairs of neighboured longer sides (strands), the pair 41, 42 and the pair 43, 44. Each of the two pairs forms a V-shape and defines the same angle α which is this example is as close as practically possible to 120 degrees. The end points of the V-shapes pairs are symmetrically connected by a pair of parallel shorter sides (bonds) of equal length 45, 46. The relative size of strands and bonds as shown defines an opening of frustro-rhombical shape. If the bonds 45, 46 were much shorter than the strands 41, 42, 43, 44, say only one-fifth of the length of the strands or less, than a substantially rhombical shape of the opening would be obtained.

Opening 31 has two mirror symmetry axes, 48, 49. The opening is elongated along axis 48, and axis 48 is selected as characteristic mirror symmetry axis of opening 31. As will be discussed further below, the axis 48 coincides with the stretching direction when the support plate 21 is made of a sheet of expanded metal.

The openings of support plate 21, at least in the central part, form a regular grid as shown. All openings are of equal size and shape, and are elongated along their respective characteristic mirror axis, along or parallel to axis 48. The characteristic direction of support plate 21 is indicated as 50.

The regular grid of plate 21 has equal repetition lengths along the characteristic direction 50 and perpendicular to the characteristic direction, i.e. the distance between points 51 and 52 and between points 53 and 54 is the same as the distance between points 51 and 53 and between points 52 and 54. Points 51, 52, 53, 54 are centrepoints of neighbouring bonds, wherein points 51 and 53 are on the same centreline 56 of bonds, and wherein points 51 and 52 are centrepoints of the bonds belonging to the same opening 33.

Each of the openings in support plate 21 is large enough to accommodate four tubes. Tubes 11, 15, 19 are indicated in FIG. 2, a number of other tubes are shown but have not been given reference numerals for the sake of clarity.

Support plate 22 is generally similar to support plate 21, in particular the shape, size and arrangement of openings in the central portion shown in FIG. 2 is the same.

Only openings 61, 62, 63, 64 of support plate 22 are indicated with reference numerals. The two mirror symmetry axes of opening 62 are indicated as 68, 69. The opening 62 is elongated along axis 69, axis 69 is therefore the characteristic mirror symmetry axis of opening 62, and at the same time represents the characteristic direction of support plate 22.

Support plate 22 has been rotated by 90 degrees with respect to support plate 21 in the paper plane. i.e. about the length direction of tubes running perpendicular to the paper plane. So the characteristic directions of the two plates, 50 and 69, are perpendicular. Also, the characteristic mirror symmetry axes of the openings in support plate 21 (all parallel to axis 48) are perpendicular to the characteristic mirror symmetry axis of the openings in support plate 22 (all parallel to axis 69). Support plates 21 and 22 are arranged such that the centre points of the bonds of one plate project onto the centre points of the openings of the other plate.

The co-operating openings in the support plates 21, 22 form support passages for a bundle of parallel tubes. One such support passage is indicated by the hatched area with reference numeral 70; all other areas in the Figure with the same size as the hatched area are also support passages. Support passages extending through the same opening in one support plate extend through different openings in another support plate. For example, the four support passages 71, 72, 73, 74 extending through opening 62 in support plate 22, extend through openings 31, 32, 33, 37, respectively, in support plate 21. Tubes are not shown in these and some other support passages for the sake of clarity. It shall be clear that a tube can be arranged in each support passage.

Tubes extending through the support passages can be supported from five different sides. In a particular example of the arrangement of FIG. 2, the tubes are 19 mm in diameter and the shortest distance between adjacent tubes is 6 mm, and the width of the cross-laths (strands and bonds) in the transverse plane is also 6 mm. In a single support plate, each tube is however only supported from a maximum of two, or three, sides. Therefore fluid in the shell side can flow easily in longitudinal direction. If tubes are smaller that the cross-section of support passages permit, the support will only be provided by the lower sides of the openings.

Suitably the support plates 23 and 25 of FIG. 1 are arranged like plate 21 in FIG. 2, and support plate 24 like plate 22. Clearly, due to the mutually perpendicular orientation characteristic directions (elongation directions) of the support plates the mirror symmetry axes of openings forming a support passage extend into different directions. E.g., axis 48 of opening 31 extends into the perpendicular direction in the plane of the plate with respect to axis 69 of opening 62, which two openings belong to support passage 71.

The support passages provided by the embodiment shown in FIG. 2 are not on an equilateral triangular pitch or square pitch. However, the arrangement is very similar to a triangular pitch and has similar high packing density. The axes of every three nearest neighboured tubes are on the corner-points of an equilateral triangle.

A further advantage of the arrangement of FIG. 2 is that a strand or bond between two neighbouring tubes runs perpendicular to a virtual line connecting the axes of the tubes in the transverse plane. This means that the width of strands and bonds in the transverse plane can be equal to the shortest distance between neighbouring tubes. Obstruction of fluid flow in the shell side is on the other hand not a problem, since a tube is only supported on two or three sides of a substantially pentagonal shaped support passage. In this way for a high packing density of tubes (comparable to tubes on a triangular pitch) maximum mechanical stability and strength, and optimum shell side fluid flow are provided. This is an advantage over the prior art; for comparison it is observed that in both embodiments of supports for tubes on a triangular pitch of U.S. Pat. No. 4,143,709, FIGS. 3 and 4, the width of the supporting cross-laths must be chosen smaller than the shortest distance between neighbouring tubes.

The support plates can be manufactured by any method that the skilled person would select. A metal plate can be provided with openings for example by punching or laser cutting. Plates could also be manufactured from welded wire gauze.

Figure 3:
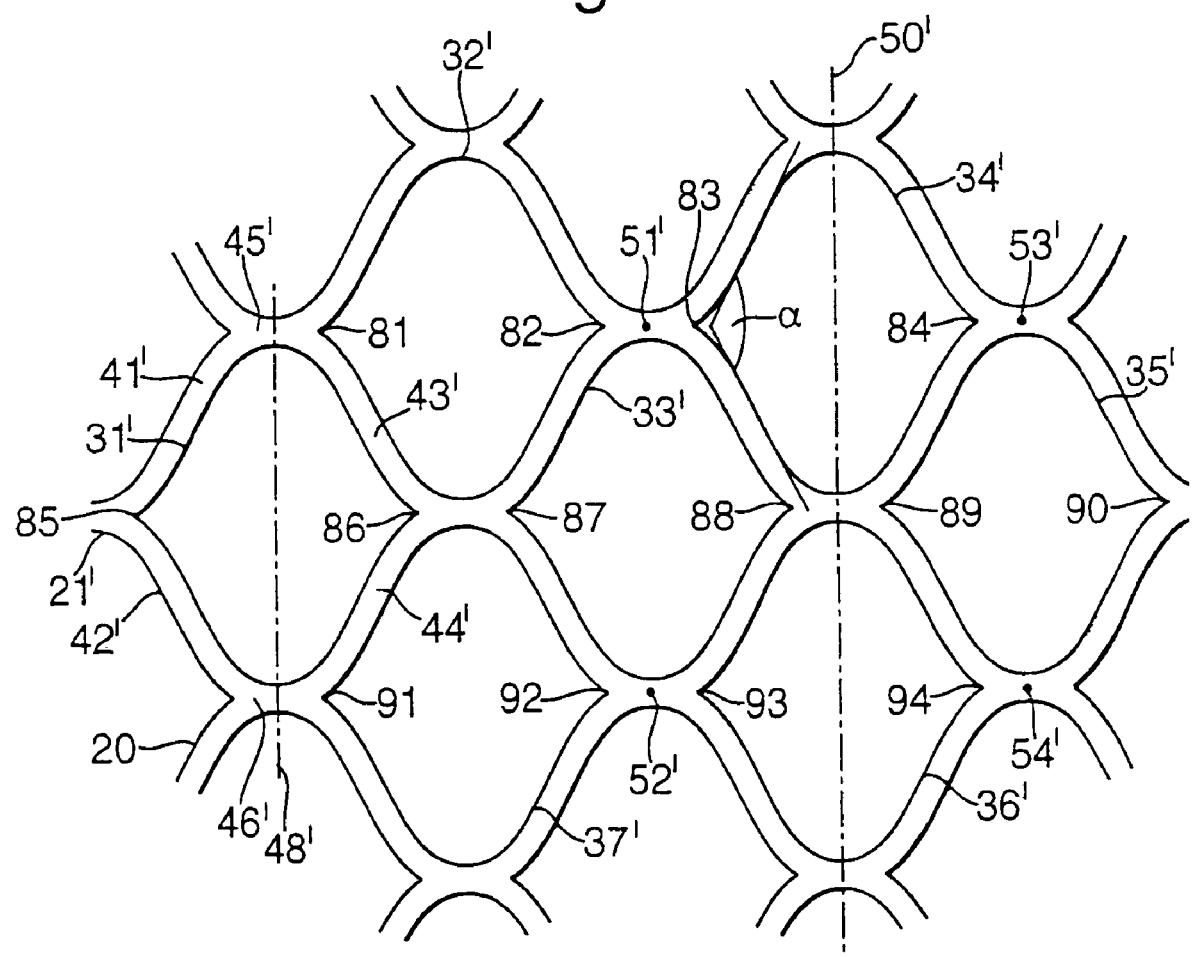
FIG. 3 shows schematically a sheet of over-stretched expanded metal for use in a tube support according to FIG. 2.

Preferably, the support plates of FIG. 2 are expanded metal sheets, wherein the stretching direction is suitably selected as the characteristic direction 50. The stretching angle corresponds to the angle α in FIG. 2, i.e. the expanded metal is overstretched (stretching angle 120 degrees). Openings obtained in expanded metal, in particular overstretched expanded metal, slightly deviate from the idealized frustro-rhombical shape of opening shown in FIG. 2. An example indicating an actual shape of substantially frustro-rhombical openings in an expanded metal sheet resembling support plate 21 in FIG. 2 is shown in FIG. 3. Reference numerals used in FIG. 3 corresponding to those used with reference to FIG. 2 are primed.

The sheet of expanded metal 20 of FIG. 3 has been manufactured by cutting a sheet of metal along virtual staggered parallel dashed lines. Following slitting, the sheet was expanded along the direction of line 50'. The slits before expansion corresponds to pairs of corner points visible in FIG. 6, e.g. pair 81 and 82, pair 83 and 84; 85 and 86; 87 and 88; 89 an 90; 91 and 92; 93 and 94. The length of the bonds (the non-slit parts along a virtual dashed line) is relatively long, i.e. longer than about one-fifth of the length of the strands (cross-laths in between bonds). E.g., the distance between points 82 and 83 or between points 86 and 87 (length of bonds) is compared with the distance between points 81 and 86 or between points 88 and 93 (length of strands). The frustro-rhombical shape of the openings in the sheet of expanded metal is best appreciated when the corner points 81, 82, . . . , 94 are considered.

The strands of the actual expanded metal, e.g. 41', 42', 43' and 44' belonging to opening 31', are slightly S-shaped. Also, the strands and the bonds are twisted about their length, which diminishes their cross-section and reduces resistance for fluid flow in the shell side. For example, tubes of 19 mm diameter and a shortest spacing of 6 mm between the tubes in the arrangement shown in FIG. 2 can be supported by a expanded metal plates manufactured from 2 mm thick steel, wherein the slits before expansion were arranged along staggered parallel dashed lines that are 8 mm spaced. Due to the twisting of strands and bonds that occurs during stretching, the effective width of strands and bonds in the transverse plane is maximal 6 mm at the points where the tubes are supported. Further, due to the tilting of strands and bonds the resistance imposed on fluid flow in the shell side is less than that of a non-tilted cross-lath.

It is observed that at the two corner points that belong to each opening the opening exhibits sharp notches, e.g. at the corner points 85 and 86 of opening 31'. The remaining part of the opening is smoothly rounded. The overall shape of openings formed in expanded metal therefore to some degree resembles a double bell shape.

The stretching angle α defined by the central parts of a substantially V-shaped pair of strands adjoined in the direction of stretching is shown for opening 34', and is as close as practically possible to 120 degrees.

It is observed that known expanded metal with approximately square openings does not have equal repetition lengths along the stretching and perpendicular directions, due to the fact that the bonds in this known expanded metal are longer than their width in the stretching direction.

Figure 4:
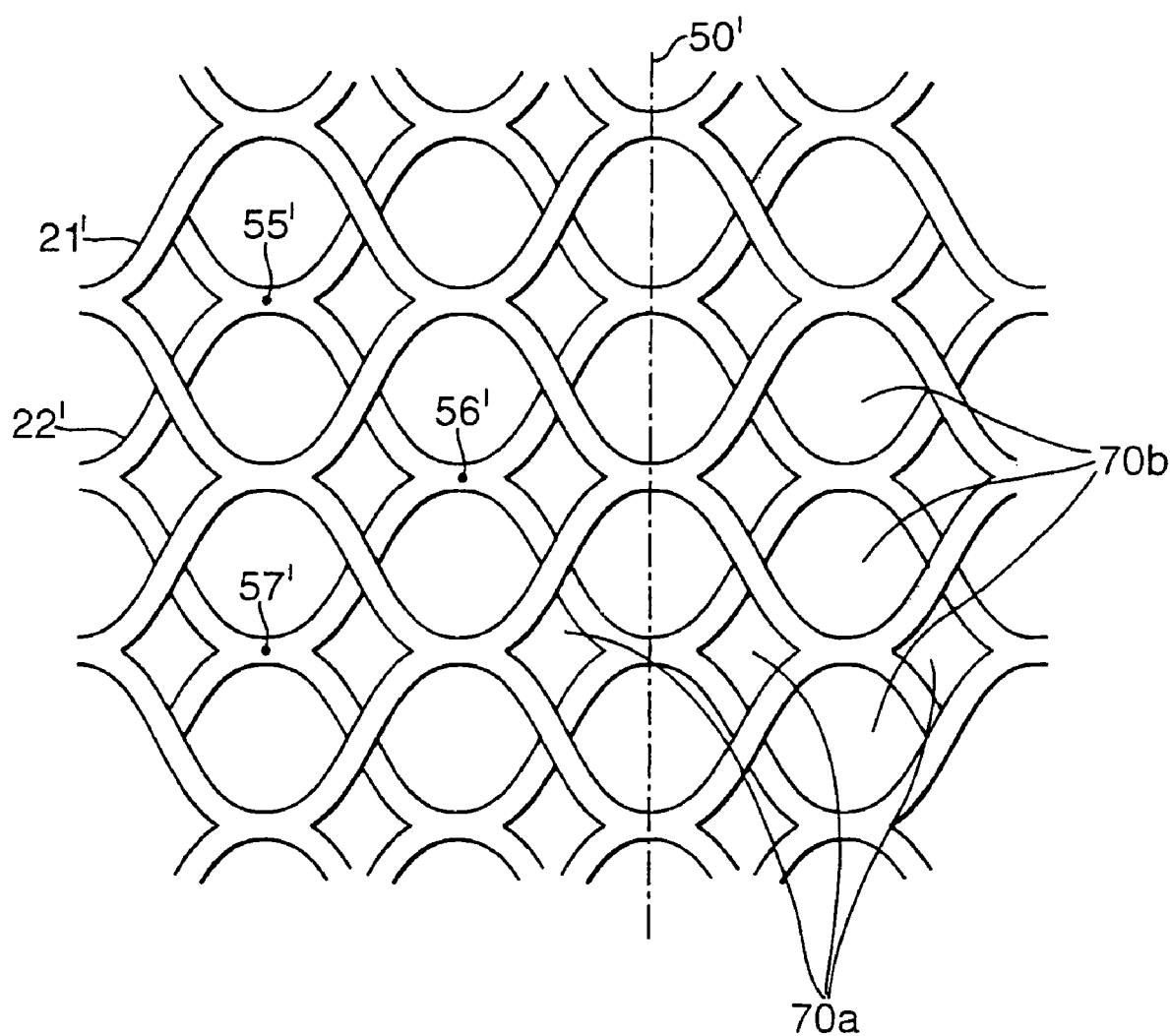
FIG. 4 shows schematically support passages formed when two sheets of expanded metal of FIG. 3 are laterally displaced relative to each other as in the prior art.

FIG. 4 shows support passages that would be obtained when two sheets of expanded metal as in FIG. 2 would be laterally displaced similar to the prior art. FIG. 2 shows the support plate 21' of FIG. 2 and an identical support plate 22' there behind. Plate 22' is laterally shifted by half a repetition length perpendicular to the direction of stretching 50' (or along the direction of stretching) with respect to plate 21', so that the projection of centrepoints of the bonds of plate 22', e.g. 55', 56', 57', are in the centre of the openings of plate 21'. The direction 50' is also the direction of stretching of plate 22'. The Figure illustrates that the lateral shifting results in two types of support passages being formed. Type 70a, of which a few examples are indicated, has two notch-like corner points in its cross-section, and the other type 70b does not have any notch-like corner points in its cross section. (Not all support passages of either type have been given a reference numeral for the sake of clarity.) The difference in cross-sections appears rather large since the width of strands with respect to the size of the openings has been slightly exaggerated for the sake of clarity. If a bundle of identical parallel tubes is to be supported by an arrangement as in FIG. 4, the maximum diameter of the tubes is determined by the passages of type 70a, and the tubes are not fully supported in the larger passages 70b.

Figure 5:
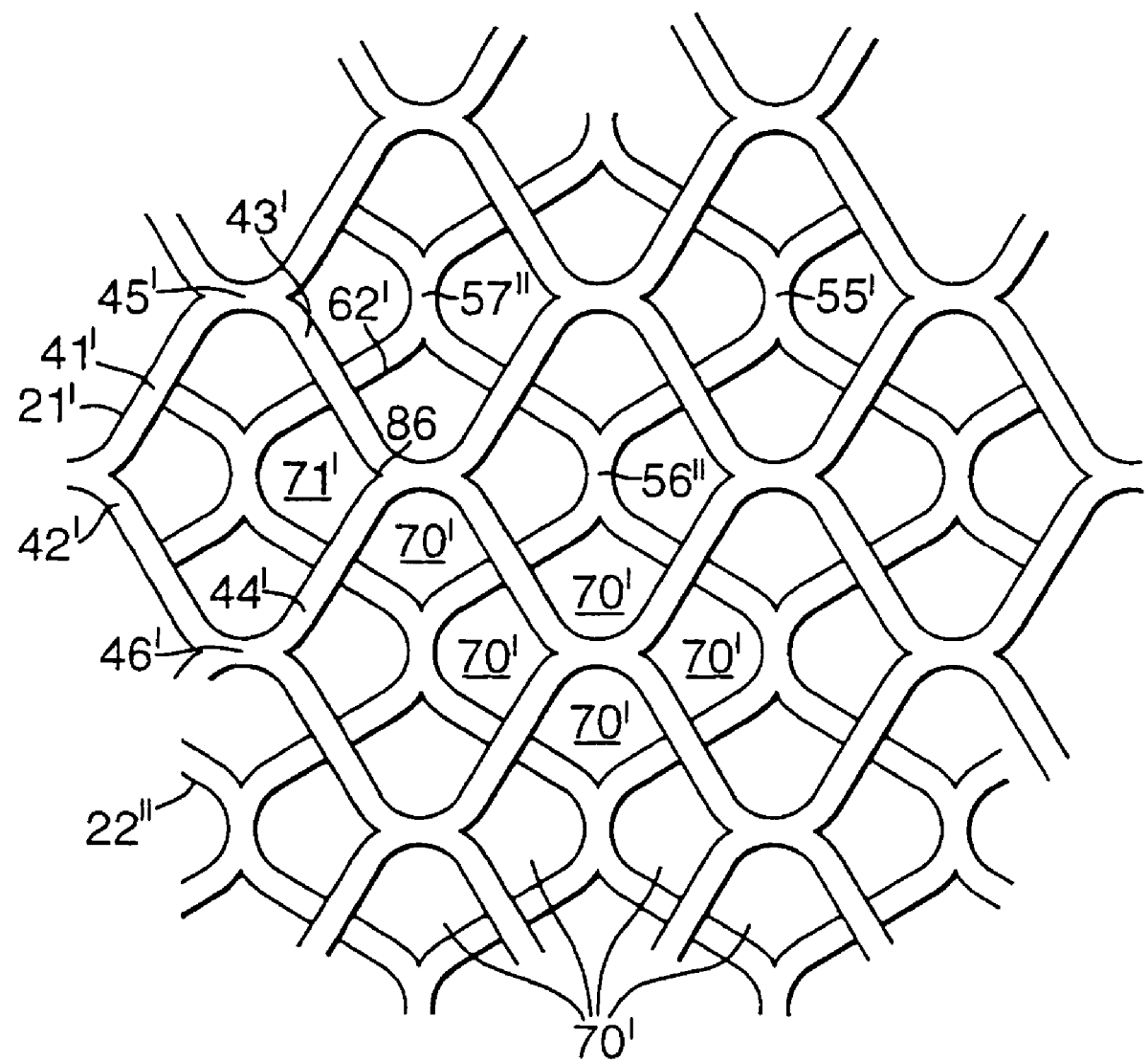
FIG. 5 shows schematically support passages formed when two sheets of expanded metal of FIG. 3 are rotated relative to each other according to the invention.

FIG. 5 shows schematically the cross-section of support passages that are obtained according to the invention with expanded metal. FIG. 5 resembles the arrangement of support plates discussed with reference to FIG. 2, wherein plates 21' and 22" are made from identical expanded metal sheets as the one shown in FIG. 3. Plate 22" behind plate 21' is rotated by 90 degrees in the paper plane and arranged such that the projection of the centrepoints of the bonds of plate 22", e.g. 55", 56", 57", are in the centre of the openings of plate 21'. In this arrangement according to the invention only one type of support passages 70' is formed. (Not all support passages have been given a reference numeral for the sake of clarity.) Each cross-section of support passages, e.g. the cross section of passage 71', is delimited by five sides, one of which is formed by a bond, e.g. of opening 62', two of which are formed by strands extending from the end of this bond, and two other sides being formed by a pair of V-shaped strands on the other support plate, e.g. 43' and 44'. Each cross-section of a support passages has one notch-like corner point, e.g. 86. The invention therefore allows the arrangement of relatively uniform support passages with support plates made from expanded metal, despite the deviations from the idealised frustro-rhombical shape. This is a particular advantage of the present invention.

Figure 6:
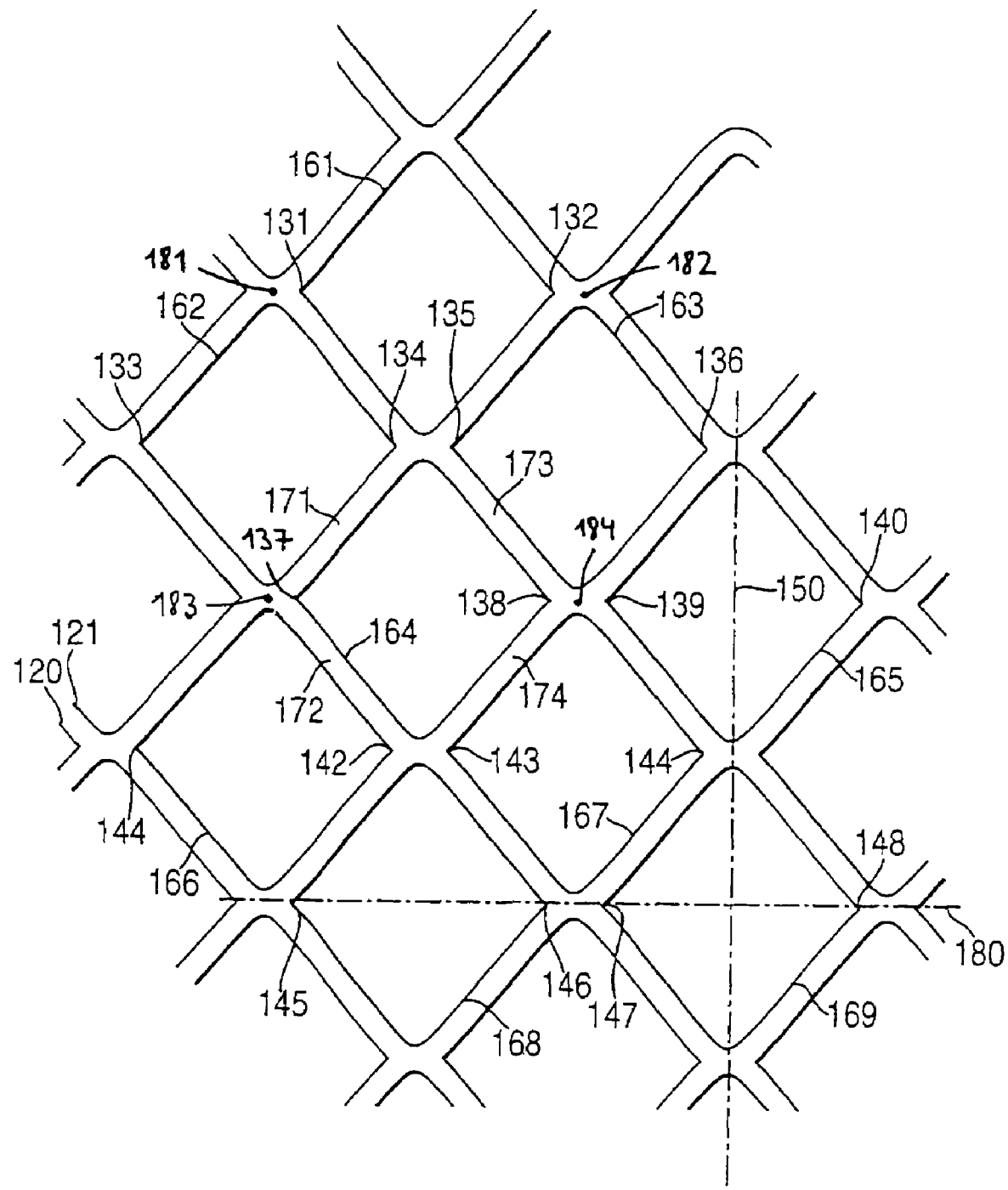
FIG. 6 shows schematically another embodiment of a sheet of over-stretched expanded metal for use in a tube support according to the invention.

Reference is made to FIG. 6 showing schematically another embodiment of a sheet of expanded metal 120 according to the present invention. The shown part of the sheet of expanded metal is the central portion of a support plate 121 for a bundle of parallel tubes according to the invention, like support plate 21 in FIG. 1.

The sheet of expanded metal 120 has been manufactured by slitting a sheet of metal along virtual staggered parallel dashed lines. Following slitting, the sheet was expanded along the direction of line 150. The slits before expansion correspond to pairs of corner points visible in FIG. 6, e.g. pair 131 and 132; pair 133 and 134; 135 and 136; 137 and 138; 139 an 140; 141 and 142; 143 and 144; 145 and 146; 147 and 148. The length of the bonds (the non-slit parts along a virtual dashed line) is much shorter, i.e. less than about one-fifth of the length of the strands (equivalent to the length of the cuts before expansion). E.g., the distance between points 138 and 139 or between points 142 and 143 (length of bonds) is compared with the distance between points 134 and 137 or between points 138 and 144 (approximate length of strands). The width of the strands in relation to the size of the openings has been slightly exaggerated for the sake of clarity.

The sheet of expanded metal 120 forms a regular grid of openings, of which openings 161, 162, 163, 164, 165, 166, 167, 168, 169 are indicated. Each opening is defined by two pairs of strands that are neighboured in the direction of stretching and two bonds interconnecting the two pairs of strands at the ends of the V-shapes. E.g., opening 164 is defined by the pair of strands 171 and 172, and by the pair 173 and 174, and by the bonds between points 134 and 135 and between points 142 and 143. Each pair of strands forms generally a V-shape defining the same stretching angle.

In the embodiment of FIG. 6 the bonds are somewhat longer along 180 than their width in the stretching direction 150. Therefore the stretching angle is just larger than 90 degrees, i.e. such that the grid defined by the centrepoints of the bonds is quadratic. Sheet 120 is therefore an overstretched sheet of expanded metal. Centrepoints of bonds are the points symmetrically between corner points defining a bond (e.g. between points 134 and 135 or between points 142 and 143), and only 181, 182, 183, 184 have been indicated for the sake of clarity in the Figure. Corner points represent the end points of slits before stretching of the expanded metal. The repetition lengths of the regular grid defined by the expanded metal sheet 120, in the direction of stretching and perpendicular to the direction of stretching, are both equal to the shortest distance between two centrepoints of bonds times the square root of 2.

The strands of the actual expanded metal, e.g. 171, 172, 173, 174, are slightly S-shaped. Also, the strands are twisted about their longitudinal axis, which diminishes their cross-section and reduces resistance for fluid flow in the shell side. At the two corner points that belong to each opening the opening exhibits sharp notches, e.g. at the corner points 137 and 138 of opening 164. The remaining part of the opening is relatively smoothly rounded.

Each opening has two mirror symmetry axes. E.g., opening 169 has two mirror symmetry axes along the stretching direction 150 and along a line 180 perpendicular to the stretching direction, through corner points 147 and 148. Due to the deviations from quadratic shape of the openings in expanded metal (slightly S-shaped strands), the two symmetry axes 150 and 180 are significantly different from each other. The mirror symmetry axis 150 along the stretching direction is therefore unique, and is selected as the characteristic mirror symmetry axis. Line 150 is at the same time the characteristic direction of the support plate 121. It is also noted that there is no rotational symmetry regarding rotation by 90 degrees and that there are no mirror symmetry axes at 45 degrees from the stretching direction 150. This is a difference with a perfect quadratic shape and also with the shape of the generally quadratic openings known from U.S. Pat. No. 4,143,709 which have more than two mirror symmetry axes.

Figure 7:
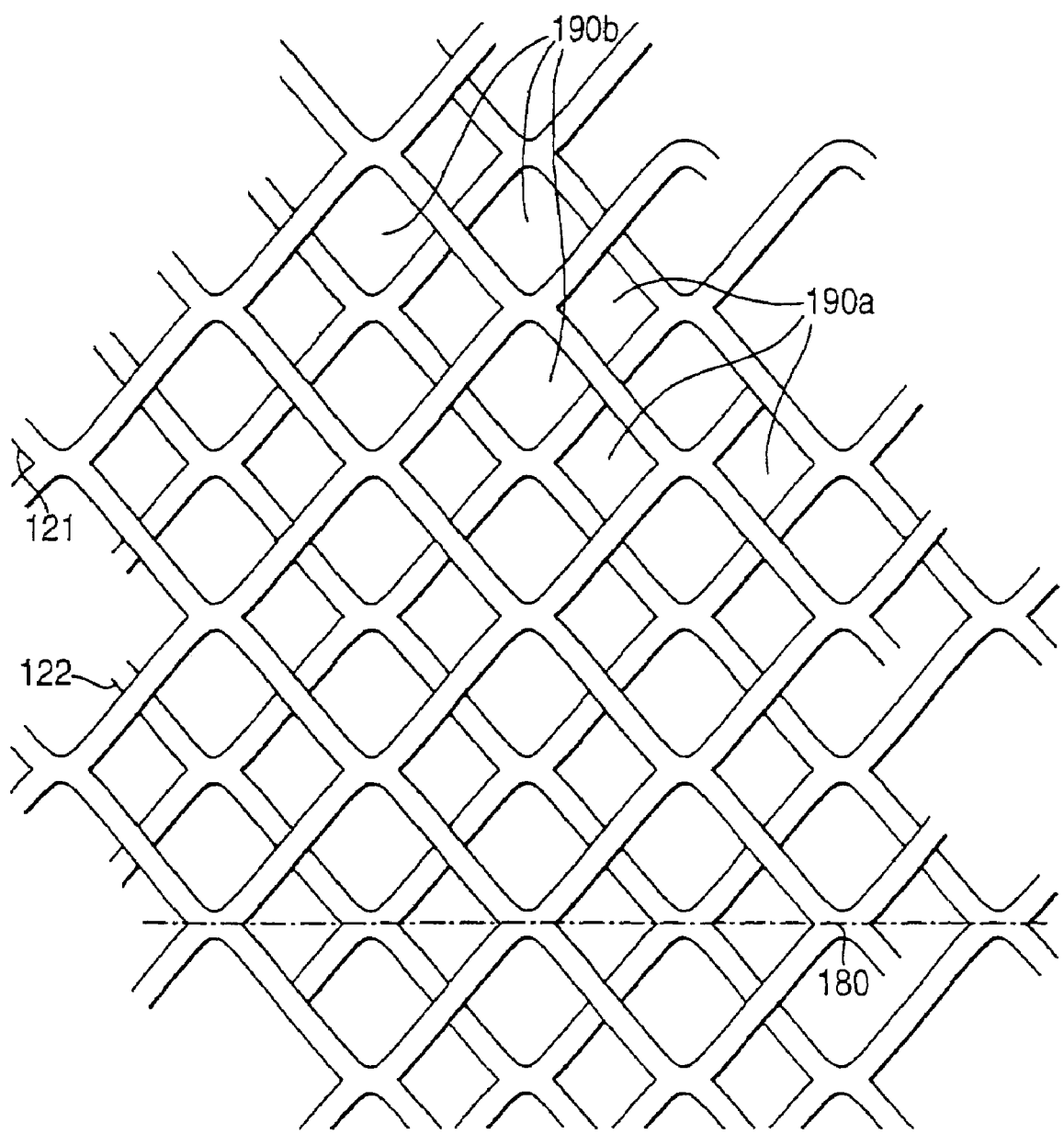
FIG. 7 shows schematically support passages formed when two sheets of expanded metal shown in FIG. 6 are laterally displaced relative to each other as in U.S. Pat. No. 4,143,709.

FIG. 7 shows support passages that would be obtained when two sheets of expanded metal as in FIG. 6 would be laterally displaced like in the prior art. FIG. 7 shows the support plate 121 of FIG. 6 and an identical support plate 122 there behind, analogous to the view of FIG. 2 with regard to FIG. 1.

Plate 122 is laterally shifted by half a repetition length along line 180 with respect to plate 121, so that the projection of centrepoints of the bonds of plate 122 are in the centre of the openings of plate 121. The Figure illustrates that also in this example the lateral shifting results in two types of support passages being formed. Type 190a with two notch-like corner points in its cross-section, and type 190b without any notch-like corner points in its cross section. Not all support passages have been given a reference numeral for the sake of clarity.

Figure 8:
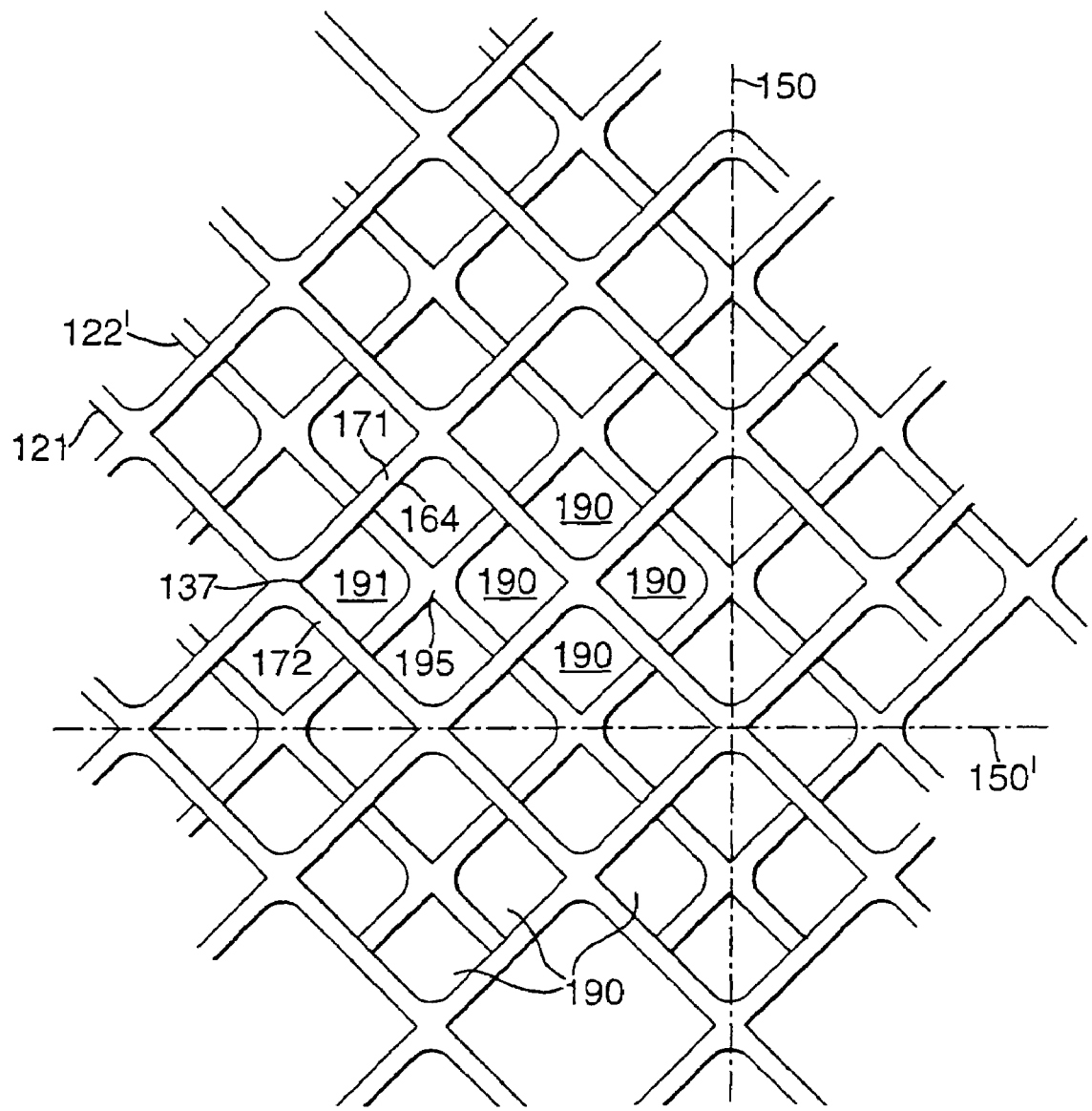
FIG. 8 shows schematically support passages formed when two sheets of expanded metal shown in FIG. 6 are rotated relative to each other according to the invention.

FIG. 8 shows schematically the cross-section of support passages that are obtained when two support plates of expanded metal of FIG. 6 are rotated relative to each other in accordance with the invention. FIG. 8 resembles the arrangement of support plates discussed with reference to FIGS. 2 and 5, but wherein plates 121 and 122' are made from identical expanded metal sheets as the one shown in FIG. 6. Plate 122' behind plate 121 is arranged according to the invention such that the characteristic directions (parallel to the stretching directions 150' of plate 122' and 150 of plate 121) are rotated by 90 degrees relative to each other in the paper plane. The plates are arranged such that the projection of the centrepoints of the bonds of plate 122' are in the centre of the openings of plate 121. In this arrangement according to the invention only one type of support passages 190 is formed. (Not all support passages have been given a reference numeral for the sake of clarity.)

Each cross-section of support passages, e.g. the cross section of passage 191, is delimited by four sides, two of which are formed by a V-shaped pair of strands, e.g. 171, 172, extending from a corner point of a bond, e.g. 137, and two other sides being formed by a two strands smoothly connected by a bond, e.g. 195 on the other support plate 122'. Each cross-section of a support passages has one notch-like corner point (e.g. 137). Also in this embodiment the invention provided relatively uniform support passages with support plates made from expanded metal, despite the deviations from the idealised frustro-rhombical shape.

It shall be clear that other regular arrangements of support passages can be obtained if the repetition lengths in different directions of the regular grids forming the support plates are not equal. For example, if the repetition lengths along and perpendicular to the characteristic direction are in an integer ratio, e.g. 1:2 or 3:2, also a regular pattern of support passages is formed. With expanded metal different integer ratios can be provided by a suitable choice of stretching angle and/or bond length. The stretching angle can differ from substantially 90 or 120 degrees, and can also be lower than 80 degrees, e.g. 45, 60 or 75 degrees.

Clearly, due to the fact that the number of tubes to be supported is not necessarily an integer multiple of the number of tubes that can fit through an opening in a support plate, and also because of tube arrangements near the (cylindrical) shell, consecutive support plates are not necessarily fully symmetrical in particular in their circumferential or annular region. Some additional support holes adapted to support a single tube may be required.

The support passages formed by the support passages of the present invention are suitably of a size such that standard tubes used in heat exchangers are well supported. Standard diameters are e.g. 19.05 mm (¾ inch), 20 mm, 25 mm, 25.4 mm (1 inch). Standard shortest distances between tube surfaces are 6 mm or 6.35 mm (¼ inch).

In a typical heat exchanger of about 6 m length and 1 to 3 m diameter, many hundred to a few thousand tubes are arranged. The skilled person knows how to determine the spacing and dimensions of the support baffles. Typical spacings are between 10 and 70 cm in the length direction of the tubes. Thickness of the plates is mainly determined by mechanical requirements, and can typically be in the range 1.6 mm-5 mm.

A particular advantage of using expanded metal support plates in heat exchangers is that a longitudinal flow with minimum restrictions in the shell side is possible, wherein the tilting of strands and bonds induces local cross-flow, which is desirable for reasons of heat transfer.

A particular application of the present invention is in chemical reactors comprising a tube bundle in a shell, for example as used in the production of ethylene oxide. A very open tube support structure is here often required.

Overstretched expanded metal, i.e. metal having a stretching angle of larger than 90 degrees, can be manufactured in any suitable way. This can be done in a single step using basically a conventional technology for producing expanded metal, but expanding to a larger stretching angle.

It is also possible to produce, in a first step, conventional expanded metal as an intermediate product, and to overstretch the intermediate product in a second step to obtain the overstretched expanded metal. Obviously the second step can also be applied to conventional expanded metal obtained from a different source, e.g. purchased in the market.

In particular, expanded metal forming a grid of openings and having a first repetition length in a first direction and a second repetition length in a second direction perpendicular to the first direction, such that the first and second repetition lengths have a predetermined ratio, can also be manufactured by
   providing pre-expanded metal having a stretching direction coinciding with the first direction, and forming a grid having a ratio of first and second repetition lengths that is smaller than the predetermined ratio; and
   applying expansion force along the first direction, at a plurality of points at various positions with respect to the second direction, until the predetermined ratio of repetition lengths is obtained, wherein the expansion force is applied using a plurality of force transmitters co-operating with the plurality of points, and wherein the force transmitters are arranged so that they can move towards each other in the second direction while applying extension force.

When expansion force is applied to slit metal or intermediate product, the longitudinal expansion is accompanied by a transverse contraction. This effect is most pronounced at high stretching angles, and in particular at stretching angles above about 85 degrees.

When the force transmitters are arranged so that they can move towards each other in the second direction while applying extension force, the expansion force can continue to be evenly distributed to the expanded metal in the course of the expansion. In this way it is prevented that e.g. the expansion is larger at the circumference of the sheet as compared to the central region. Therefore it is achieved that deviations from the repetition length over the sheet are minimized and a relatively uniform shape of openings is obtained, also and in particular for overstretched expanded metal.

In an advantageous embodiment the force transmitters have the form of substantially parallel arms provided with hooks for engaging the expanded metal.

In another advantageous embodiment a tool is used that comprises two sets of parallel members connected with joints to each other so as to form a hingeable grid that can assume configurations with different tool angles between the sets of parallel members, wherein the force transmitters are arranged on the grid and extending out of the plane of the grid.

The expression "force transmitter" is used to refer to a pin, tenon, pivot, wedge or other means of suitable shape to transmit force to the expanded metal.

That which is claimed is:

1. A support for a bundle of parallel tubes, which support comprises at least two transverse support plates spaced apart along the length direction of the tubes to be supported, wherein each plate is provided with a plurality of openings of substantially rhombical or substantially frustro-rhombical shape, each of which openings having a maximum of two mirror symmetry axes including a characteristic mirror symmetry axis, the openings being large enough to accommodate at least two tubes, wherein openings in different support plates are arranged to form support passages for parallel tubes so that support passages extending through the same opening in one support plate extend through different openings in another support plate, and wherein the characteristic mirror symmetry axes of at least two openings belonging to the same support passage are arranged to extend in different directions, and wherein the openings are elongated in the direction of their characteristic mirror symmetry axis.

2. The support according to claim 1, wherein the openings forming a selected support passage have their characteristic mirror symmetry axes arranged in two mutually perpendicular directions.

3. The support according to claim 2, wherein the openings in a support plate form a regular grid, wherein the characteristic mirror symmetry axes of the openings in this support plate are parallel thereby defining a characteristic direction of the support plate, and wherein consecutive support plates are arranged so that their characteristic directions are rotated relative to each other about the length direction of the tubes to be supported.

4. The support according to claim 3, wherein the regular grid has a first repetition length along the characteristic direction and a second repetition length perpendicular to the characteristic direction, and wherein the first and second repetition lengths are substantially equal.

5. The support according to claim 4, wherein each support plate comprises a sheet of expanded metal.

6. The support according to claim 5, wherein expanded metal has been stretched so that it comprises a stretching angle of between substantially 90 and 140 degrees, preferably a stretching angle of substantially 90 or substantially 120 degrees.

7. The support according to claim 6, when arranged internally in a cylindrical vessel comprising a cylindrical shell, in particular as part of a heat exchanger or of a chemical reactor.

8. The support according to claim 5, when arranged internally in a cylindrical vessel comprising a cylindrical shell, in particular as part of a heat exchanger or of a chemical reactor.

9. The support according to claim 4, when arranged internally in a cylindrical vessel comprising a cylindrical shell, in particular as part of a heat exchanger or of a chemical reactor.

10. The support according to claim 3, wherein each support plate comprises a sheet of expanded metal.

11. The support according to claim 3, when arranged internally in a cylindrical vessel comprising a cylindrical shell, in particular as part of a heat exchanger or of a chemical reactor.

12. The support according to claim 2, wherein each support plate comprises a sheet of expanded metal.

13. The support according to claim 2, when arranged internally in a cylindrical vessel comprising a cylindrical shell, in particular as part of a heat exchanger or of a chemical reactor.

14. The support according to claim 1, wherein the openings forming a selected support passage have their characteristic mirror symmetry axes arranged in two mutually perpendicular directions.

15. The support according to claim 1, wherein the openings in a support plate form a regular grid, wherein the characteristic mirror symmetry axes of the openings in this support plate are parallel thereby defining a characteristic direction of the support plate, and wherein consecutive support plates are arranged so that their characteristic directions are rotated relative to each other about the length direction of the tubes to be supported.

16. The support according to claim 1, wherein each support plate comprises a sheet of expanded metal.

17. The support according to claim 1, when arranged internally in a cylindrical vessel comprising a cylindrical shell, in particular as part of a heat exchanger or of a chemical reactor.

* * * * *